(12) United States Patent
Asahi

(10) Patent No.: US 6,195,186 B1
(45) Date of Patent: Feb. 27, 2001

(54) OPTICAL WDM RING NETWORK

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/984,091

(22) Filed: Dec. 3, 1997

(30) Foreign Application Priority Data

Dec. 4, 1996 (JP) .................................................. 8-337727

(51) Int. Cl.[7] .......................... H04B 10/00; H04B 10/24; H04B 17/00
(52) U.S. Cl. ............................ 359/110; 359/117; 359/119
(58) Field of Search .................................... 359/125, 110, 359/119, 118, 127, 128, 152, 167, 173, 177

(56) References Cited

U.S. PATENT DOCUMENTS

| | | | |
|---|---|---|---|
| 5,442,623 | * | 8/1995 | Wu ........................................ 370/16.1 |
| 5,717,796 | * | 2/1998 | Clendening ............................. 385/24 |
| 5,923,449 | * | 6/1999 | Doerr et al. ........................... 359/125 |
| 6,023,359 | * | 2/2000 | Asahi ..................................... 359/119 |

FOREIGN PATENT DOCUMENTS 6-97950   4/1994  (JP) .

OTHER PUBLICATIONS

A.F. Elrefaie, "Multiwavelength Survivable Ring Network Architectures", ICC Geneva, 48.7, May 23–26, 1993.
R.E. Wagner, et al., "Survivable WDM Rings for Interoffice Networks", OEC'94, 1994, 12C3-1.

* cited by examiner

Primary Examiner—Jason Chan
Assistant Examiner—Agustin Bello
(74) Attorney, Agent, or Firm—McGuireWoods, LLP

(57) ABSTRACT

A ring network is composed of an even-number of optical fibers wherein each pair of optical fibers forms a bidirectional transmission line and a plurality of nodes coupled through the optical fibers in ring topology. In this ring system, each of the nodes includes the even-number of Add/Drop circuits coupled to the optical fibers, respectively, and the even-number of optical transceivers each including an optical transmitter and an optical receiver. A switch changes a combination of an Add/Drop circuit and each of the optical transmitter and the optical receiver.

21 Claims, 16 Drawing Sheets

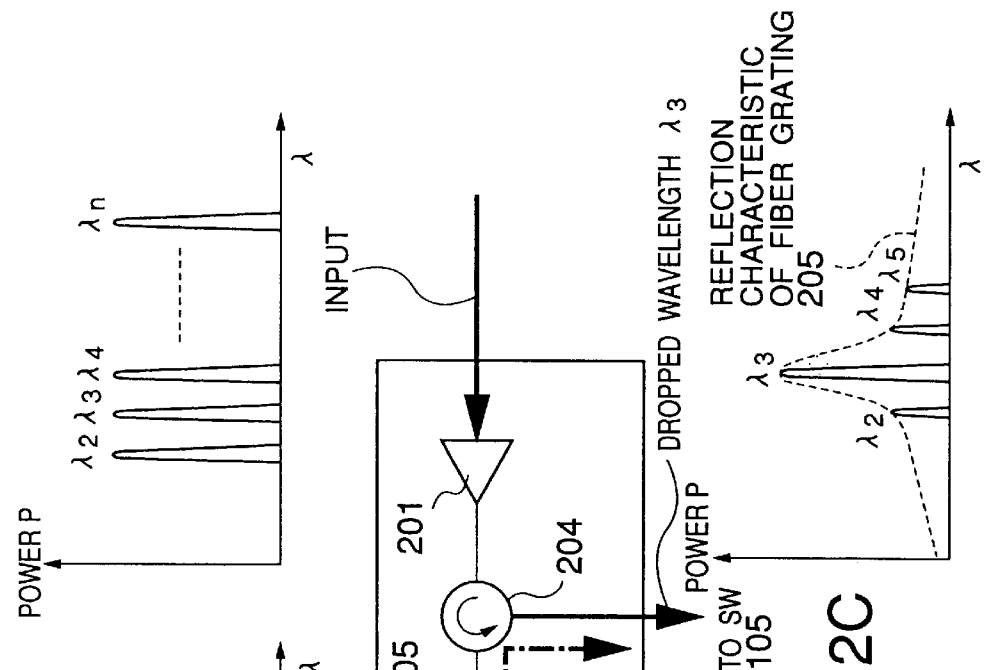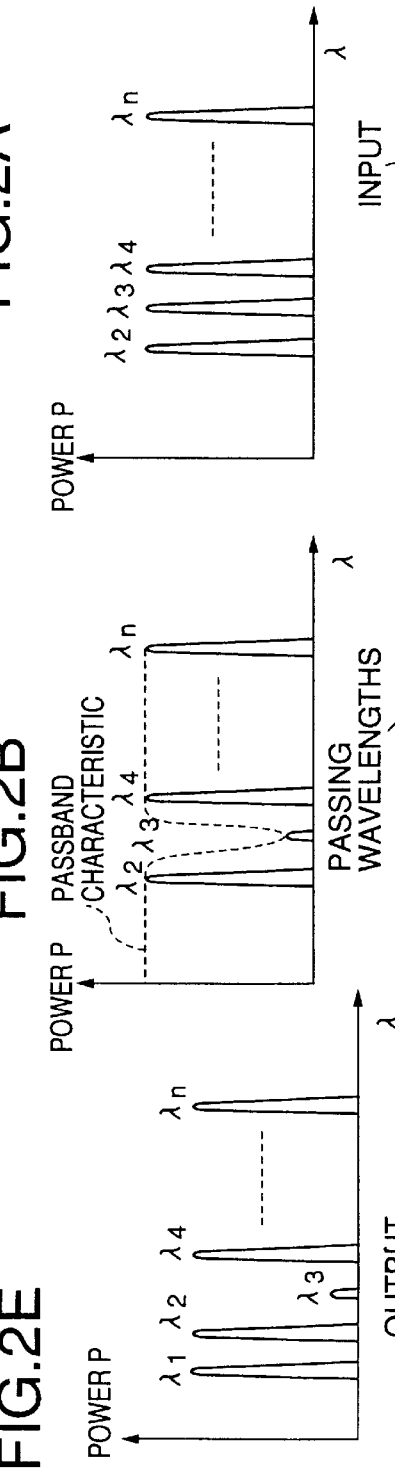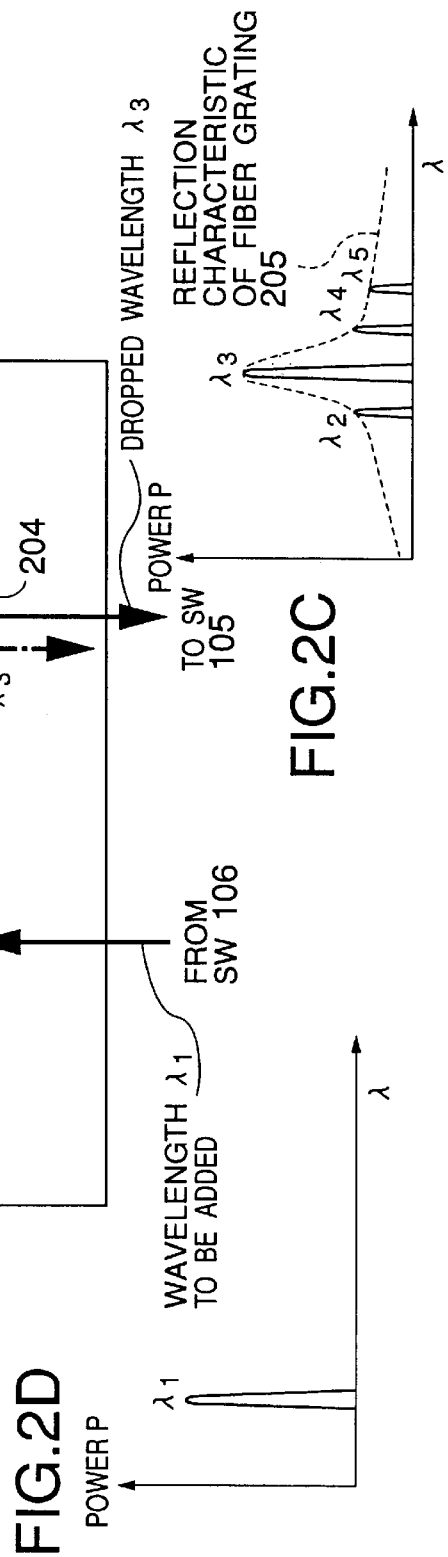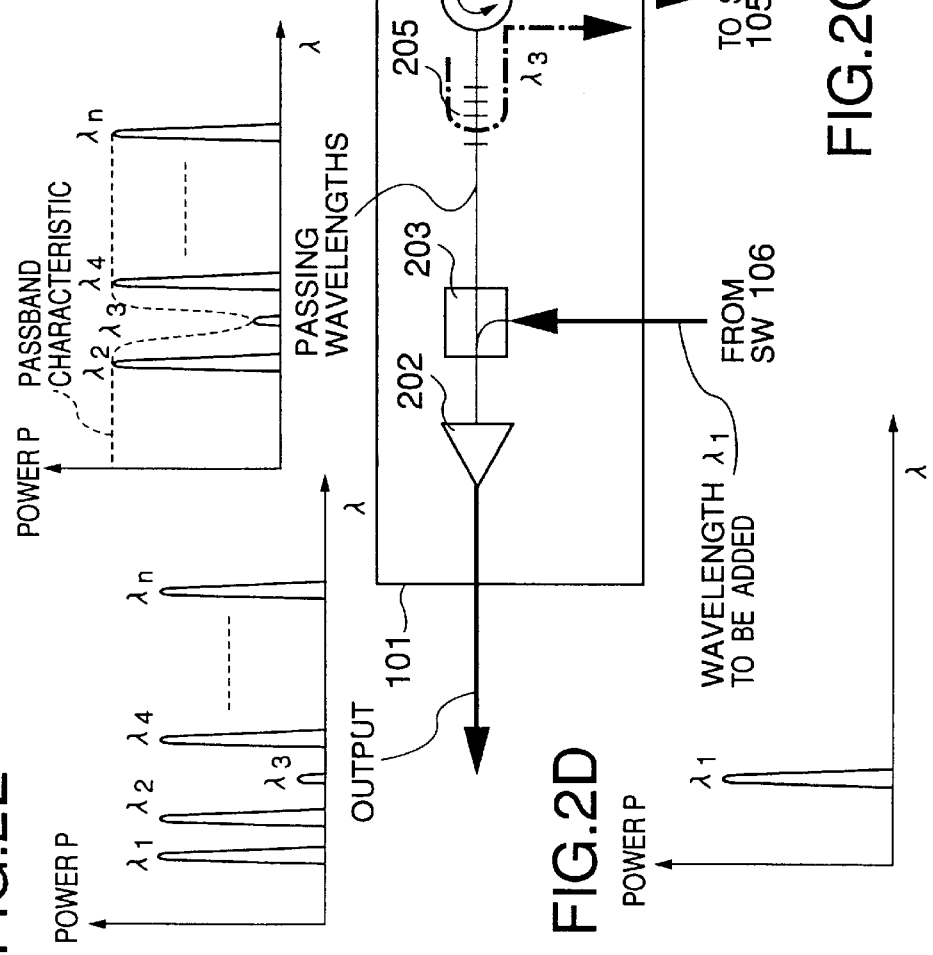

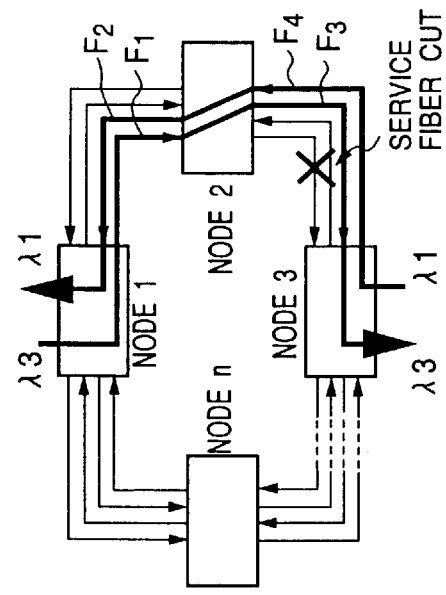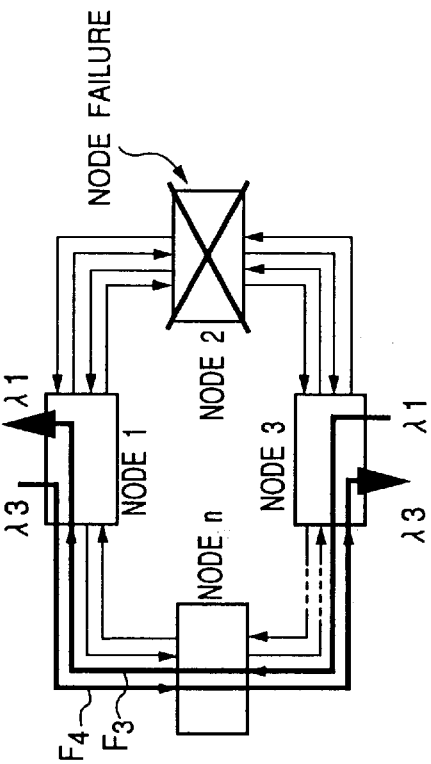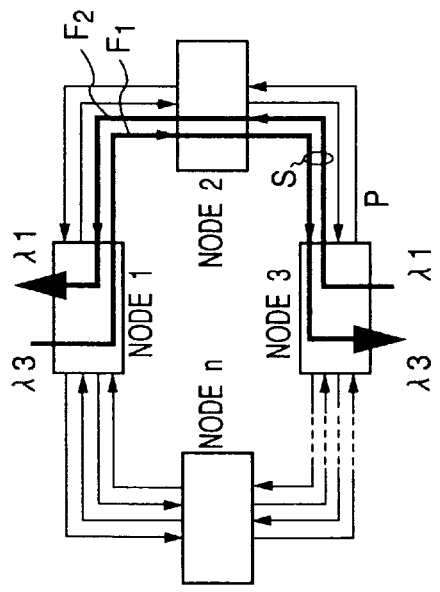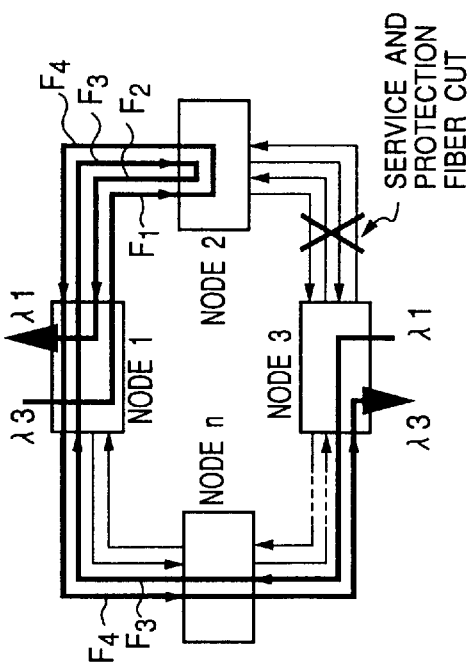

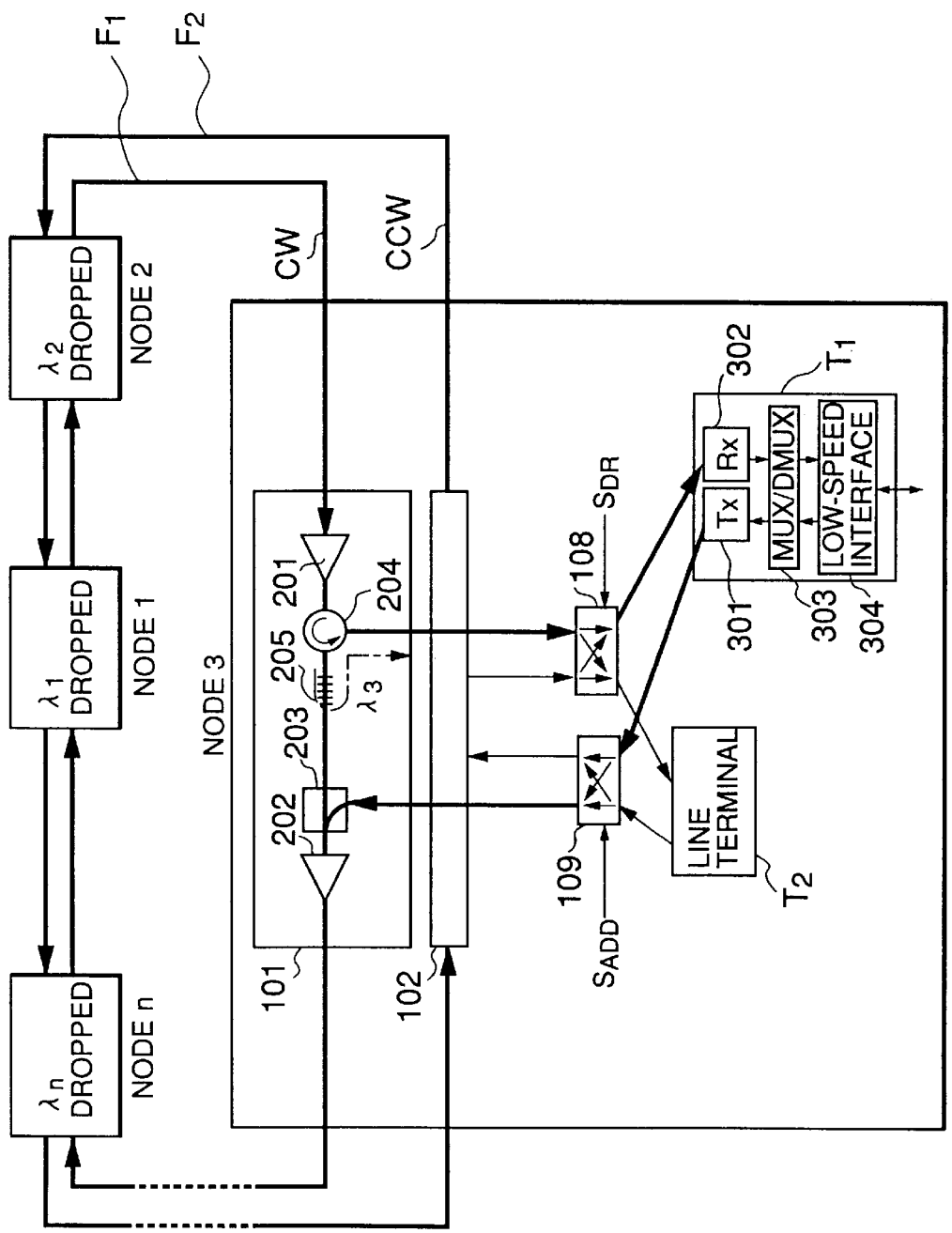

OPTICAL WDM RING NETWORK

BACKGROUND OF THE INVENTION

1. Field of the Invention

The present invention generally relates to an optical ring network, and in particular to a ring network having a protection capability using Wavelength-Division Multiplexing (WDM) technology.

2. Description of the Related Art

In an optical WDM ring network using a wavelength for services and another wavelength for protection, duplicate signals are generated by a node to travel over an optical fiber in opposite directions. In each node of the ring network, it is determined whether a signal can be received from another node on the wavelength for services. If a node receives the signal on the wavelength for services, the node selects the service wavelength to receive a transmission signal.

In case of a cable cut or a node failure occurring at a location, however, the node cannot receive the signal on the service wavelength from another node which is located between the failure location and the node in the downstream direction. In this case, the node selects the protection wavelength to receive the duplicate transmission signal traveling in the opposite direction. Therefore, data transmission can be performed as normal even if transmission failures occur. Such an optical WDM ring network has been disclosed in Japanese Patent Unexamined Publication No. 6-97950.

Other survivable WDM ring networks have been proposed by A. F. Elrefale (ICC'93 Geneva. 1993, Geneva, paper 48.7) and by R. E. Wagner et al. (OEC'94, 1994, Japan, 14C3-1).

However, the conventional ring network as described above has disadvantages in that the number of assigned wavelengths is twice that of nodes because a pair of wavelengths for service and protection are assigned to each node. This results in broadened necessary bandwidth. Further, a wavelength selector provided at each node has the increased number of wavelengths to be selected. Furthermore, since duplicate signals are traveling in opposite directions, a transmission line cannot be used effectively.

SUMMARY OF THE INVENTION

An object of the present invention is to provide an optical WDM ring network which can effectively use wavelength components thereof to achieve high performance.

Another object of the present invention is to provide an optical WDM ring network which can ensure reliable data transmission in case of line or node failures.

According to the present invention, in a ring network that includes a plurality of transmission media and a plurality of nodes coupled through the transmission media in ring topology, each of the nodes includes a transceiver for transmitting and receiving a plurality of signals and a switch for changing a path for each signal which is transmitted and received to and from one of the transmission media through the path.

Further, the present invention may be applied to a ring network including an even-number of optical fibers wherein each pair of optical fibers forms a bidirectional transmission line and a plurality of nodes coupled through the optical fibers in ring topology. In this ring system, each of the nodes includes the even-number of interfaces coupled to the optical fibers, respectively, and the even-number of optical transceivers each comprising an optical transmitter and an optical receiver, wherein each of the optical transmitter and the optical receiver is coupled to a selected one of the interfaces The node is further provided with a switch for changing a combination of an interface and each of the optical transmitter and the optical receivers Since the switch can select one of the transmission media for transmitting or receiving each signal, all wavelength components in the ring network are usable for services without the need of setting wavelengths for protection. Therefore, the wavelength components can be used effectively, resulting in reduced wavelength band and the reduced number of wavelengths to be selected in each node.

BRIEF DESCRIPTION OF THE DRAWINGS

FIGS. 2A–2E are spectrum diagrams for explanation of operation of an Add/Drop circuit in the first embodiment;

FIG. 9A is a diagram showing a normal operation of the second embodiment of FIG. 8;

FIG. 9B is a diagram showing an operation of the second embodiment of FIG. 8 in the case of service fiber cut;

FIG. 9C is a diagram showing an operation of the second embodiment of FIG. 8 in the case of service and protection fiber cut;

FIG. 9D is a diagram showing an operation of the second embodiment of FIG. 8 in the case of node failure;

FIG. 11 is a block diagram showing an optical WDM ring network according to a fourth embodiment of the present invention;

DETAILED DESCRIPTION OF THE PREFERRED EMBODIMENTS

First Embodiment

Figure 1:
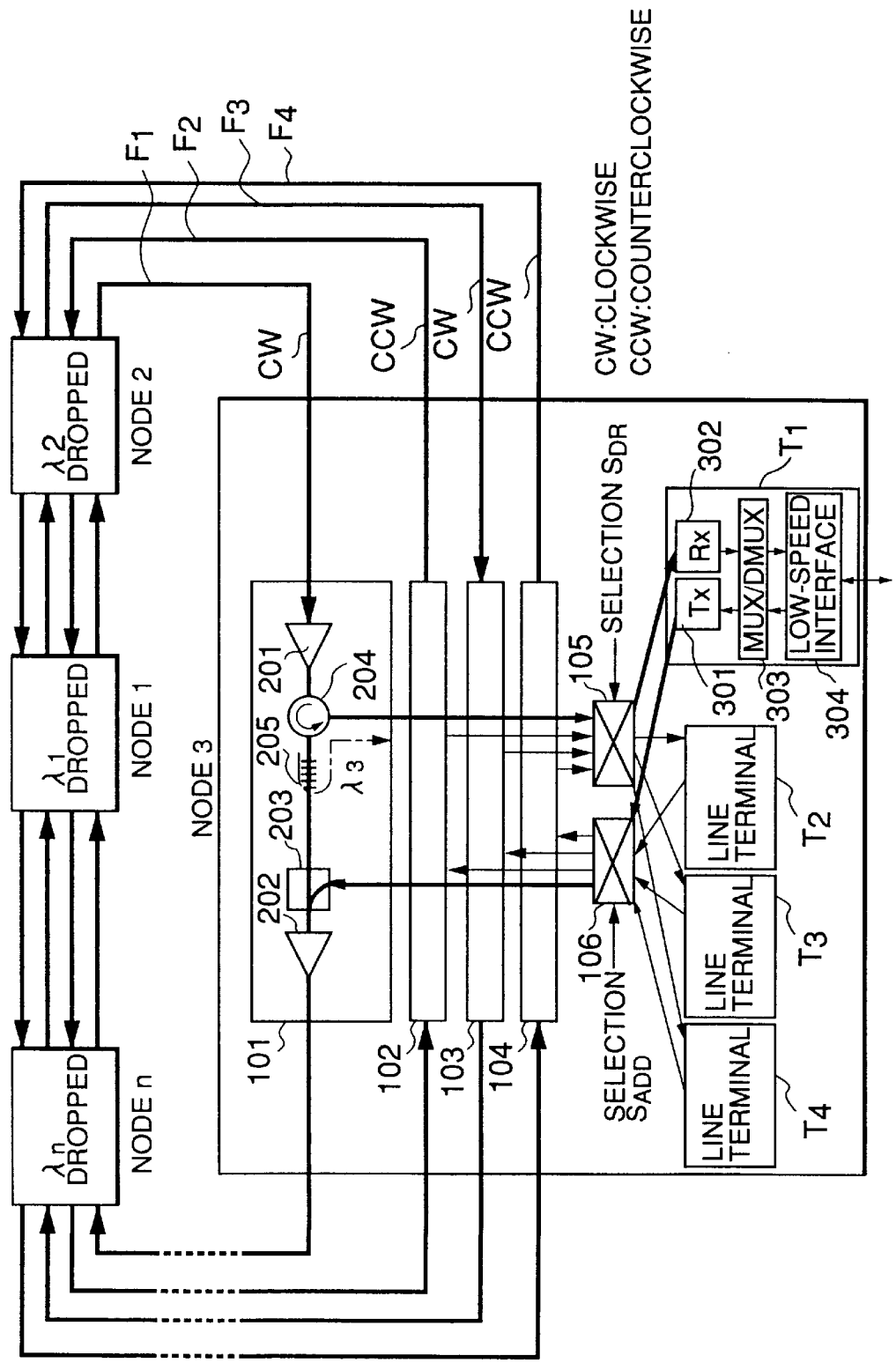
FIG. 1 is a block diagram showing an optical WDM ring network according to a first embodiment of the present invention.

Referring to FIG. 1, there is shown a WDM ring network having a plurality of nodes NODE1, NODE2, ..., NODEn which are optically connected in a ring topology through four fibers $F_1$–$F_4$. The four fibers may be classified under service and protection bidirectional fiber pairs. Here, the fibers $F_1$ and $F_2$ are a service bidirectional fiber pair and the fibers $F_3$ and $F_4$ are a protection bidirectional fiber pair.

The nodes NODE1, NODE2, ..., NODEn on the ring have different receiving wavelengths previously assigned thereto. As shown in the figure, the receiving wavelengths $\lambda_1$–$\lambda_n$ are assigned to the nodes NODE1, NODE2, ..., NODEn, respectively. Therefore, the signal on the wavelength $\lambda_1$, for example, cannot be received at the nodes but the node NODE1. Further, each node can drop and receive the signal on the assigned wavelength from any fiber and can select a transmitting wavelength from $\lambda_1$–$\lambda_n$ depending on which node a signal should be transmitted to, as will be described later.

Each node has the same basic circuit configuration as shown in FIG. 1. Taking the node NODE3 as an example, it is provided with four optical Add/Drop circuits 101–104 which are inserted on the four fibers $F_1$–$F_4$, respectively. In each optical Add/Drop circuit, a signal on the assigned wavelength (here, $\lambda_3$) is dropped and output to a 4×4 matrix switch 105 for reception and, on the other hand, a now signal to be added on a selected wavelength is received from a 4×4 matrix switch 106 for transmission.

The 4×4 matrix switch 105 selectively connects the optical Add/Drop circuits 101–104 to the optical receivers of line terminals $T_1$–$T_4$ depending on a selection control signal $S_{DR}$. Similarly, the 4×4 matrix switch 106 selectively connects the optical Add/Drop circuits 101–104 to the optical transmitters of the line terminals $T_1$–$T_4$ depending on a selection control signal $S_{ADD}$.

Each of the line terminals $T_1$–$T_4$ is provided with a tunable optical transmitter 301, an optical receiver 302, a multiplexer/demultiplexer 303 and a low-speed interface 304. The tunable optical transmitter 301 can be set to a selected wavelength and the optical receiver 302 is fixed to the corresponding wavelength (here, $\lambda_3$).

Add/Drop Circuit

Referring to FIGS. 2A–E, each of the optical Add/Drop circuits 101–104 is composed of optical amplifiers 201 and 202, an optical combiner 203, an optical circulator 204 and a fiber grating 205. Input WDM signals on the wavelengths $\lambda_1$–$\lambda_n$ as shown in FIG. 2A are amplified by the optical amplifier 201 and then pass through the optical circulator 204 to the fiber grating 205. The fiber grating 205 reflects the components of the assigned wavelength (here, $\lambda_3$) and the remaining wavelength components as shown in FIG. 2B pass through the fiber grating 205. The reflected wavelength components as shown in FIG. 2C go back to the optical circulator 204 which guides them to the 4×4 matrix switch 105.

On the other hand, when receiving the passing wavelength components from the fiber grating 205 and further a new signal to be added on a selected wavelength (here, A;) as shown in FIG. 2D from the 4×4 matrix switch 106, the optical combiner 203 combines them and then the optical amplifier 202 amplifies the combined wavelength components as shown in FIG. 2E.

Fiber Grating

Figure 3A:
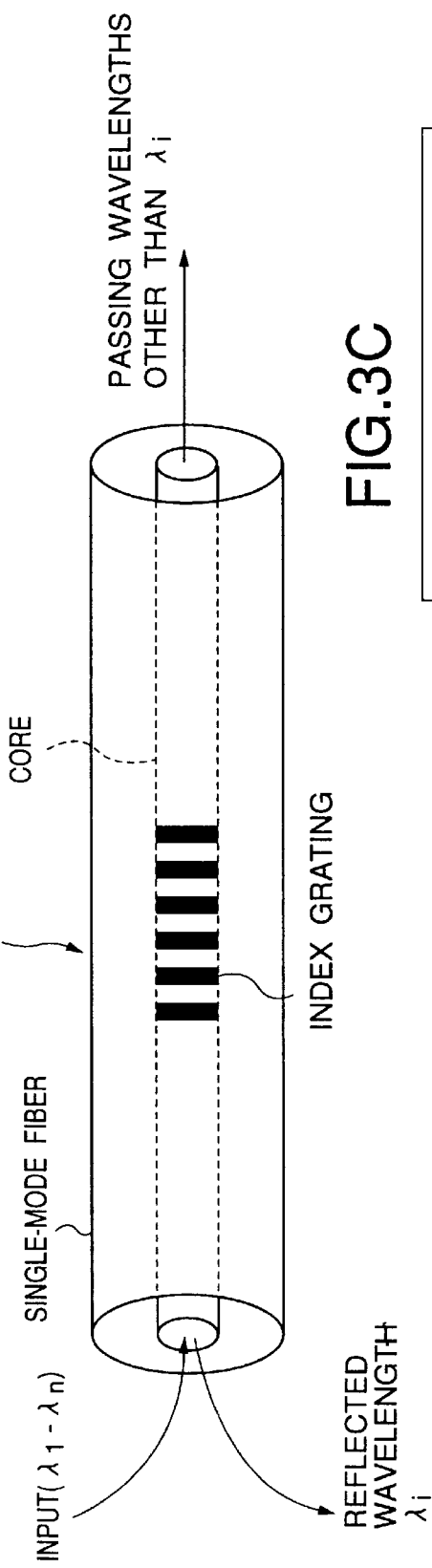
FIG. 3A is a schematic diagram showing a fiber grating in the Add/Drop circuit of FIG. 2.
Figure 3C:
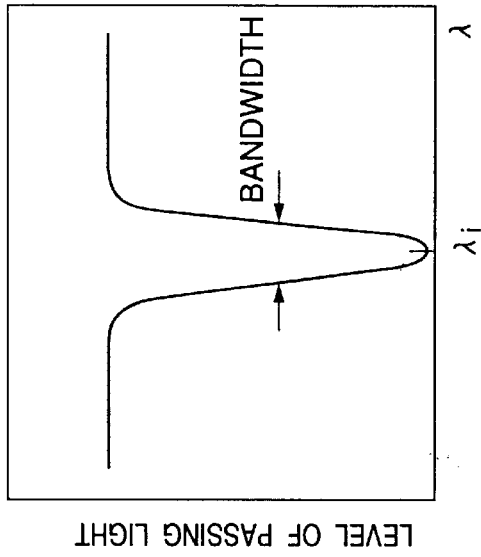
FIG. 3C is a diagram showing a passband characteristic of the fiber grating.
Figure 3B:
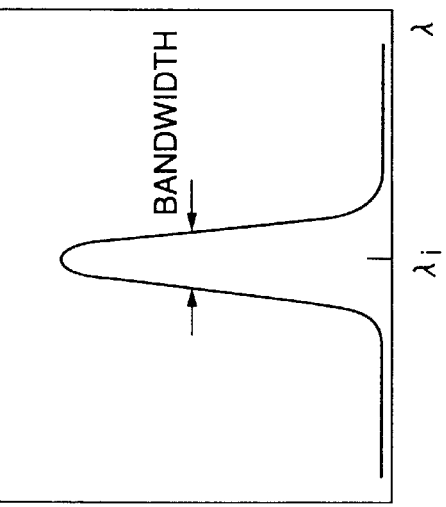
FIG. 3B is a diagram showing a reflection characteristic of the fiber grating.

Referring to FIG. 3A, the fiber grating 205 is composed of an index grating which is formed by strongly exposing a core of a single-mode fiber in a predetermined pattern. Among input WDM signals on the wavelengths $\lambda_1$–$\lambda_n$, only the signal on a specific wavelength $\lambda_1$ which is matched to the predetermined pattern of the index grating is reflected and goes back to the optical circulator 204. The remaining signals travel through the fiber grating 205 to the optical combiner 203. The passing or reflecting bandwidth of the fiber grating 205 may be set within the range from 0.5 nm to 1.0 nm as shown in FIGS. 3B and 3C.

4×4 Matrix Switch

Figure 4:
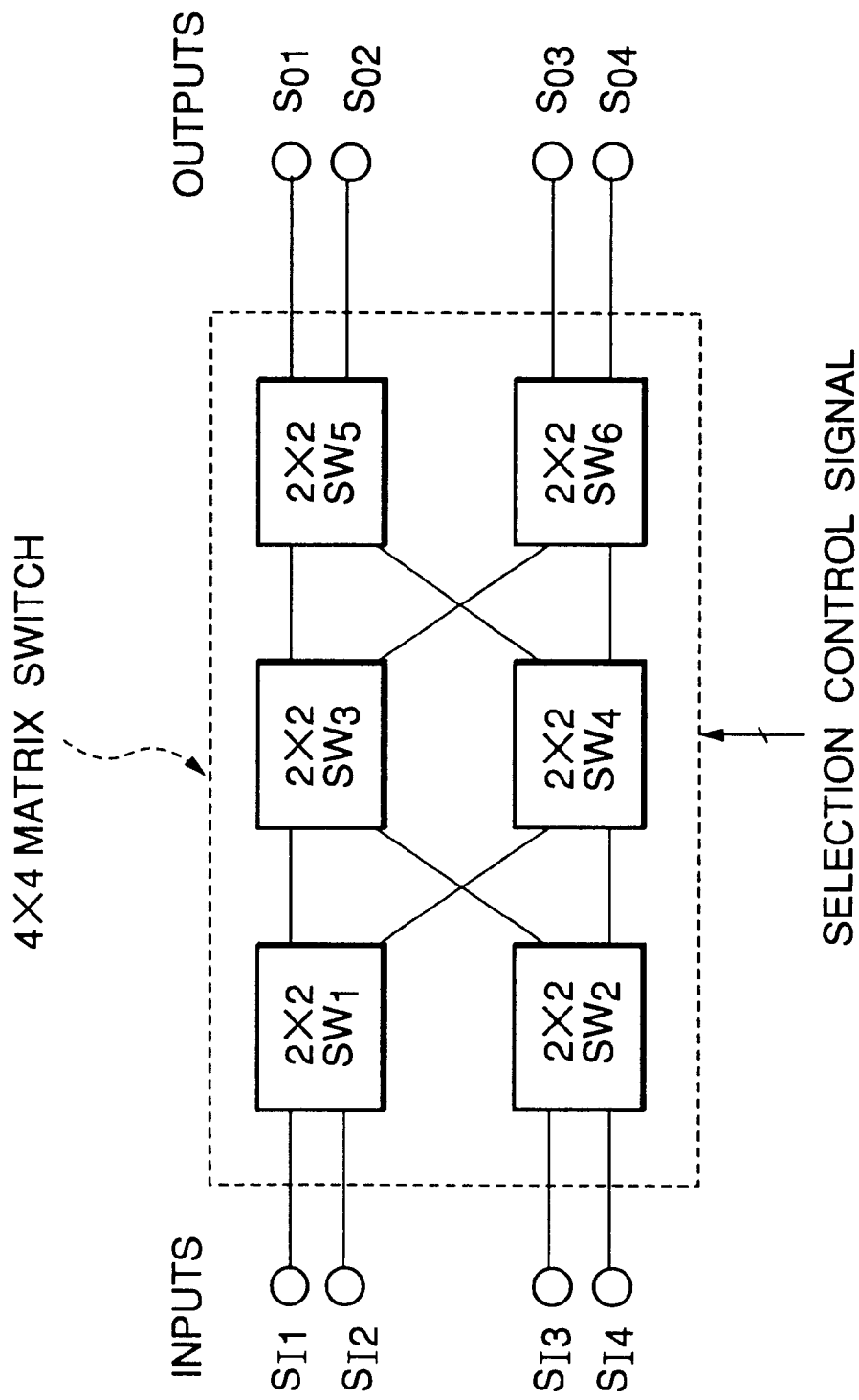
FIG. 4 is a block diagram showing a 4×4 matrix switch in the first embodiment of FIG. 2.

Referring to FIG. 4, each of the 4×4 matrix switches 105 and 106 is provided with six 2×2 optical switches $SW_1$–$SW_6$ which are arranged in a matrix on a substrate and each may be made of $LiNbO_3$ and the like. The 2×2 optical switches $SW_1$–$SW_6$ are connected through waveguides as follows. The two output terminals of the 2×2 optical switches $SW_1$ are connected to the first input terminal of the 2×2 optical switches $SW_3$ and the first input terminal of the 2×2 optical switches $SW_4$, respectively. Similarly, the two output terminals of the 2×2 optical switches $SW_3$ are connected to the first input terminal of the 2×2 optical switches $SW_5$ and the first input terminal of the 2×2 optical switches $SW_6$, respectively. The two output terminals of the 2×2 optical switches $SW_2$ are connected to the second input terminal of the 2×2 optical switches $SW_3$ and the second input terminal of the 2×2 optical switches $SW_4$, respectively. Similarly, the two output terminals of the 2×2 optical switches $SW_4$ are connected to the second input terminal of the 2×2 optical switches $SW_5$ and the second input terminal of the 2×2 optical switches $SW_4$, respectively.

The respective 2×2 optical switches $SW_1$–$SW_4$ perform switching operations to form paths from input terminals to output terminals depending on the selection control signal. Therefore, each of input signals $S_{I1}$–$S_{I4}$ can be output as one of output signals $S_{O1}$–$S_{O4}$.

Optical Transmitter

Figure 5C:
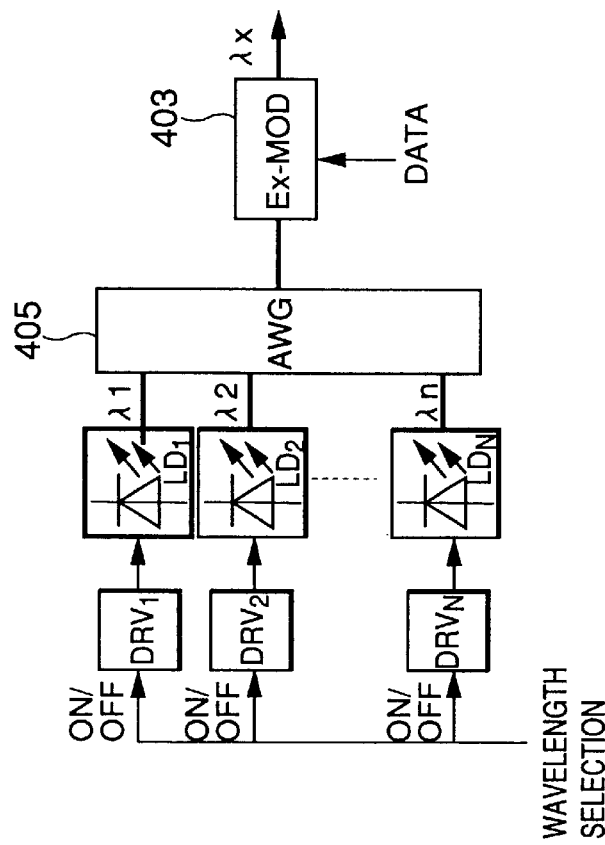
FIG. 5C is a block diagram showing a third example of an optical transmitter in the first embodiment of FIG. 2.

As described above, the optical transmitter 301 can select a transmitting wavelength from $\lambda_1$–$\lambda_n$ depending on which node a signal should be transmitted to. Several examples of such an optical transmitter can be considered as shown in FIGS. 5A–5C.

Figure 5A:
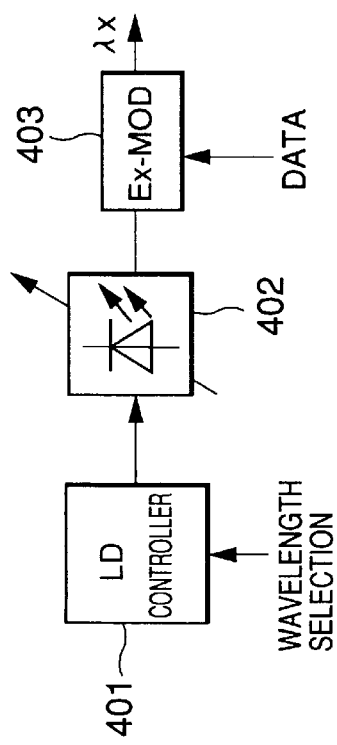
FIG. 5A is a block diagram showing a first example of an optical transmitter in the first embodiment of FIG. 2.

Referring to FIG. 5A, the optical transmitter 301 is composed of an LD controller 401, a tunable laser diode (LD) 402 and an external modulator 403. The LD controller 401 controls the output wavelength of the tunable laser diode 402 depending on a wavelength selection signal. The external modulator 403 performs the intensity modulation of the laser light of a selected wavelength $\lambda_x$ (x=1, 2, . . . , n) received from the tunable laser diode 402 depending on transmission data.

Figure 5B:
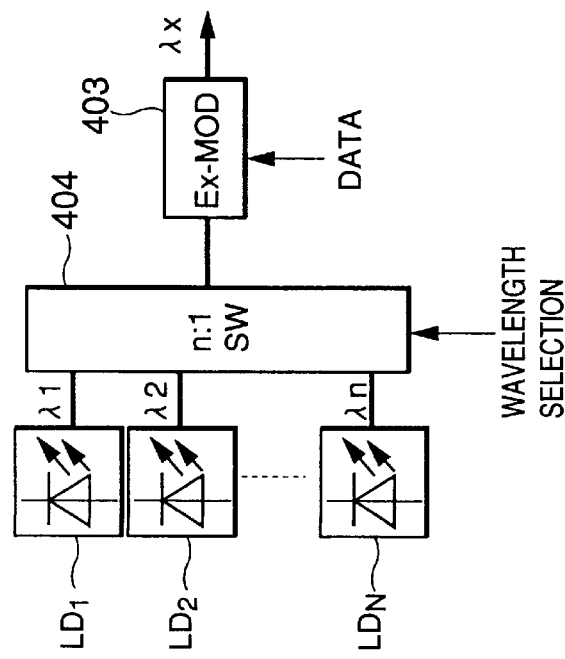
FIG. 5B is a block diagram showing a second example of an optical transmitter in the first embodiment of FIG. 2.

Referring to FIG. 5B, the optical transmitter 301 is composed of n laser diodes $LD_1$–$LD_N$, a n:1 optical switch 404 and the external modulator 403. The laser diodes $LD_1$–$LD_N$ output n laser lights of wavelengths $\lambda_1$–$\lambda_n$, respectively. The n:1 optical switch 404 selects one of the laser lights of wavelengths $\lambda_1$–$\lambda_n$ depending on the wavelength selection signal. The external modulator 403 performs the intensity modulation of the selected laser light of a selected wavelength $\lambda_x$ (x=1, 2, . . . , n) depending on transmission data Referring to FIG. 5C, the optical transmitter 301 is composed of n laser diodes $LD_1$–$LD_N$, n drivers $DRV_1$–$DRV_N$, and an optical WDM coupler 405, and the external modulator 403. The drivers $DRV_1$–$DRV_N$ are controlled by the wavelength selection signals such that a selected one of the laser diodes $LD_1$–$LD_N$ is driven to output the laser light of the corresponding wavelength $\lambda_x$ to the optical WDM coupler 405. The external modulator 403 performs the intensity modulation of the laser light of a selected wavelength $\lambda_x$ (x=1, 2, . . . , n) depending on transmission data.

Operation

For simplicity, operations in the ring network will be described in the case where the node NODE1 communicates with the node NODE3.

Figure 6A:
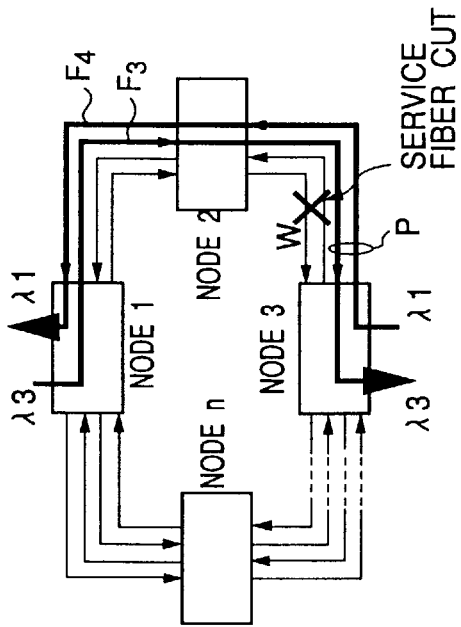
FIG. 6A is a diagram showing a normal operation of the first embodiment of FIG. 2.

Referring to FIG. 6A, under normal conditions, the node NODE1 communicates with the node NODE3 through the node NODE2, the clockwise service fiber $F_1$ and the counterclockwise service fiber $F_2$. The node NODE1 transmits an optical signal on wavelength $\lambda_3$ onto the clockwise service fiber $F_1$ and the node NODE3 receives the optical signal on wavelength $\lambda_3$ from the clockwise service fiber $F_1$. On the other hand, the node NODE3 transmits an optical signal on wavelength $\lambda_1$ onto the counterclockwise service fiber $F_2$ and the node NODE1 receives the optical signal on wavelength $\lambda_1$ from the counterclockwise service fiber $F_2$. The receiving/transmitting and add/drop operations of each node are as described before.

Figure 6B:
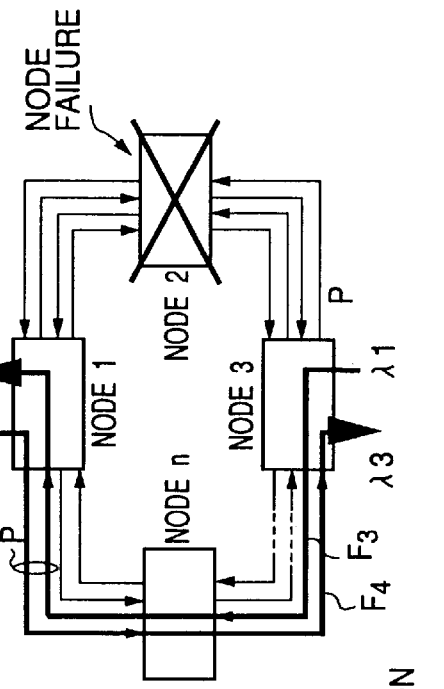
FIG. 6B is a diagram showing an operation of the first embodiment of FIG. 2 in the case of service fiber cut.

Referring to FIG. 6B, in the case of service fiber cut occurring between the node NODE2 and the node NODE3, the node NODE1 changes the respective connection states of the 4×4 optical switches 105 and 106 such that an optical signal on wavelength $\lambda_3$ is transmitted onto the clockwise protection fiber $F_3$ and an optical signal on wavelength $\lambda_1$ is received from the counterclockwise protection fiber $F_4$. Similarly, the node NODE3 changes the respective connection states of the 4×4 optical switches 105 and 106 such that an optical signal on wavelength $\lambda_1$ is transmitted onto the counterclockwise protection fiber $F_4$ and an optical signal on wavelength $\lambda_3$ is received from the clockwise protection fiber $F_3$.

Figure 6C:
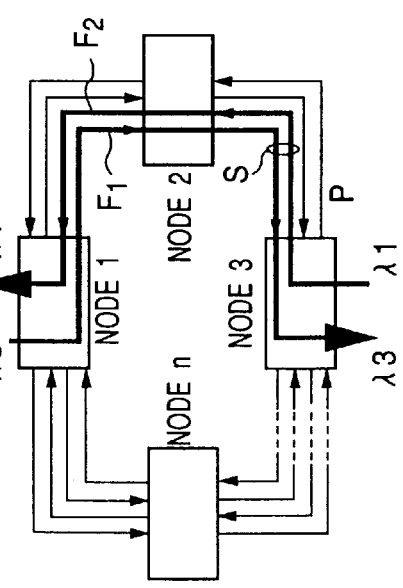
FIG. 6C is a diagram showing an operation of the first embodiment of FIG. 2 in the case of service and protection fiber cut.

Referring to FIG. 6C, in the case of service and protection fiber cut occurring between the node NODE2 and the node NODE3, the node NODE1 changes the respective connection states of the 4×4 optical switches 105 and 106 such that an optical signal on wavelength $\lambda_3$ is transmitted onto the counterclockwise protection fiber $F_4$ and an optical signal on wavelength $\lambda_1$ is received from the clockwise protection fiber $F_3$. Similarly, the node NODE3 changes the respective connection states of the 4×4 optical switches 105 and 106 such that an optical signal on wavelength $\lambda_1$ is transmitted onto the clockwise protection fiber $F_3$ and an optical signal on wavelength $A_2$ is received from the counterclockwise protection fiber $F_4$.

Figure 6D:
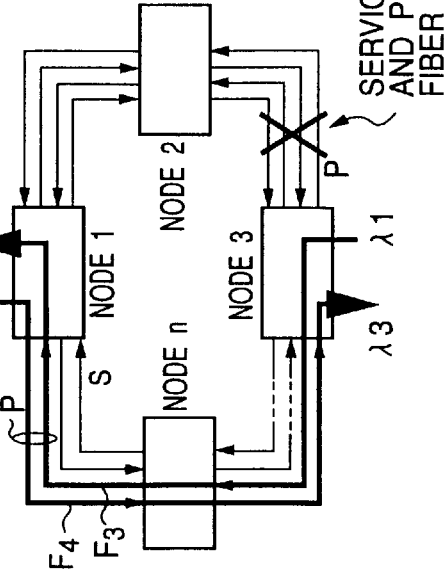
FIG. 6D is a diagram showing an operation of the first embodiment of FIG. 2 in the case of node failure.

Referring to FIG. 6D, in the case of failure of the node NODE2, the respective nodes NODE1 and NODE3 change the respective connection states of the 4×4 optical switches 105 and 106 as in the case of FIG. 6C.

As described above, the 4×4 optical switches 105 and 106 selectively connects the optical Add/Drop circuits 101–104 to the optical receivers and the optical transmitters of line terminals $T_1$–$T_4$, all wavelength components in the ring network are usable for services without the need of setting wavelengths for protection. Therefore, the wavelength components can be used effectively, resulting in reduced wavelength band and the reduced number of wavelengths to be selected in each node.

Further, even in the case of node failure and/or fiber cut as shown in FIGS. 6B–6D, the both sides can select another pair of optical fibers for protection to ensure communications between two nodes as normal.

Figure 7:
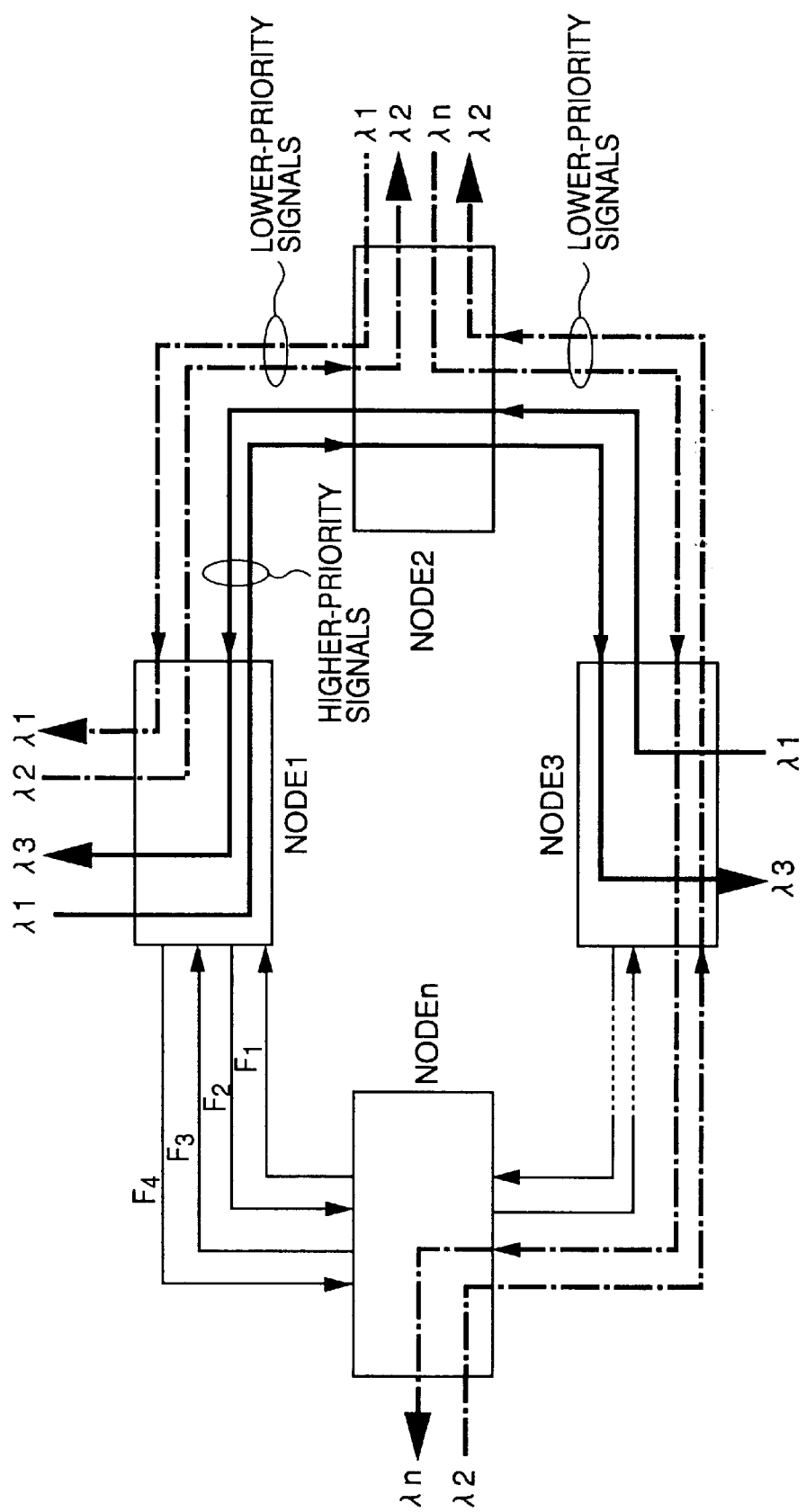
FIG. 7 is a diagram showing another normal operation of the ring network of FIG. 2.

As shown in FIG. 7, by controlling the 4×4 optical switches 105 and 106, another communications mode may be set under normal conditions. More specifically, the respective nodes NODE1, NODE2, NODE3 and NODEn change the respective connection states of the 4×4 optical switches 105 and 106 such that high-priority communication between the nodes NODE1 and NODE3 through the service fibers $F_1$ and $F_2$ and further low-priority communications between the nodes NODE1 and NODE2 and between the nodes NODE2 and the node NODEn through the protection fibers $F_3$ and $F_4$. In this communication mode, when service fiber cuts or node failures occur, the higher-priority communications are protected as described above but the lower-priority communications are possibly broken down. In other words, the lower-priority communications may be performed through protection fibers based on the premise of the possibility of breakdown. Therefore, data transmission can be performed with a higher degree of efficiency.

Second Embodiment

Figure 8:
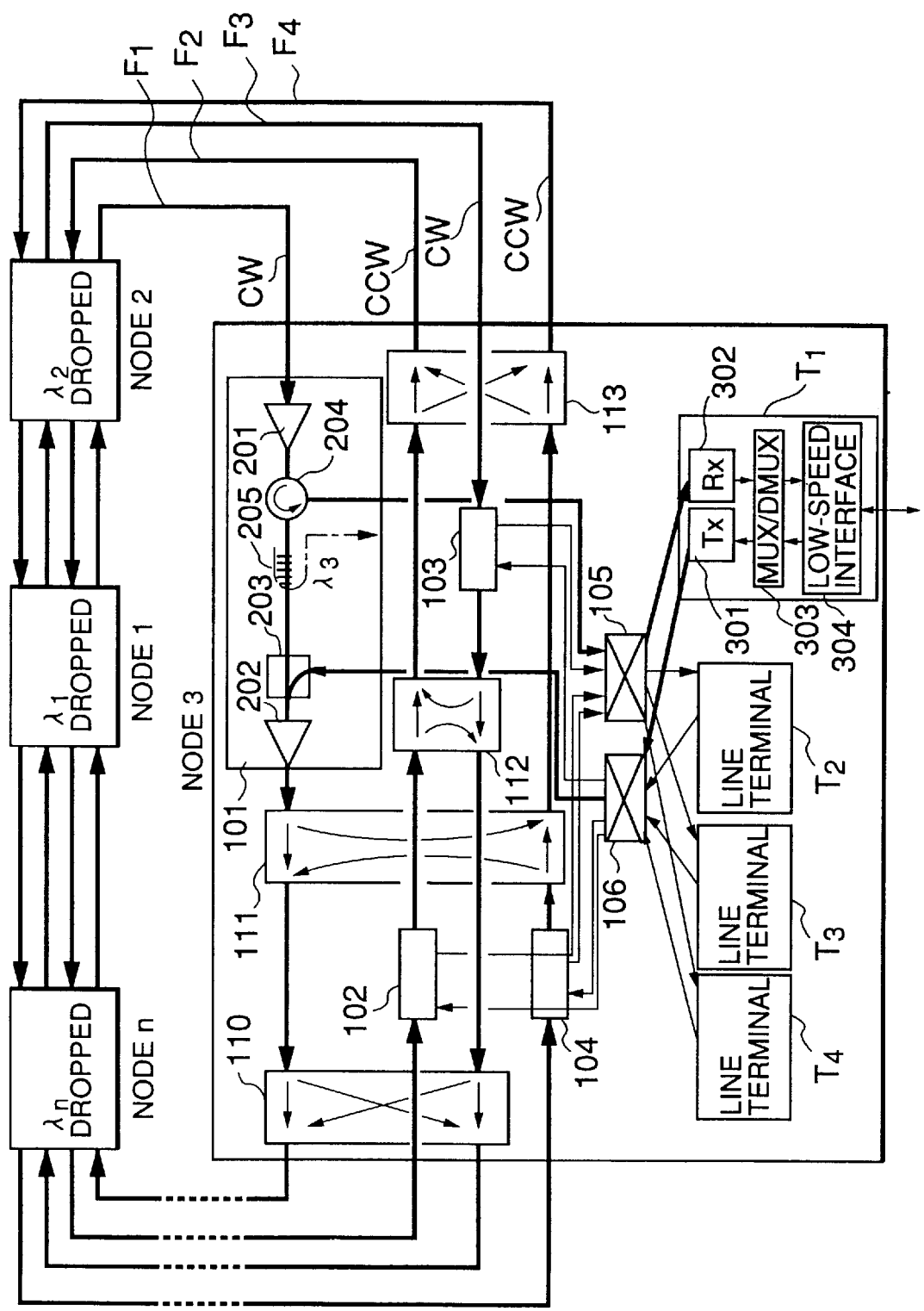
FIG. 8 is a block diagram showing an optical WDM ring network according to a second embodiment of the present invention.

Referring to FIG. 8, there is shown a WDM ring network where circuit blocks similar to those previously described with reference to FIG. 1 are denoted by the same reference numerals and their details will be described as necessary.

Each node has the same basic circuit configuration as shown in FIG. 8. Taking the node NODE3 as an example, it is provided with four optical Add/Drop circuits 101–104 which are inserted on the four fibers $F_1$–$F_4$, respectively. In each optical Add/Drop circuit, a signal on the assigned wavelength (here, $\lambda_2$) is dropped and output to a 4×4 matrix switch 105 for reception and, on the other hand, a new signal to be added on a selected wavelength is received from a 4×4 matrix switch 106 for transmission.

The 4×4 matrix switch 105 selectively connects the optical Add/Drop circuits 101–104 to the optical receivers of line terminals $T_1$–$T_4$ depending on a selection control signal $S_{DR}$. Similarly, the 4×4 matrix switch 106 selectively connects the optical Add/Drop circuits 101–104 to the optical transmitters of the line terminals $T_1$–$T_4$ depending on a selection control signal $S_{ADD}$.

Each of the line terminals $T_1$–$T_4$ is provided with a tunable optical transmitter 301, an optical receiver 302, a multiplexer/demultiplexer 303 and a low-speed interface 304. The tunable optical transmitter 301 can be set to a selected wavelength and the optical receiver 302 is fixed to the corresponding wavelength (here, $\lambda_3$) as described before.

Further, each node has a routing function which is implemented by 2×2 optical switches 110–113 as shown in FIG. 8. More specifically, the 2×2 optical switch 110 is provided between two routes corresponding to the clockwise service fiber $F_1$ and the clockwise protection fiber $F_3$, respectively, to select one from the two routes corresponding to the clockwise service fiber $F_1$ and the counterclockwise protection fiber $F_2$. The 2×2 optical switch 111 is provided between two opposite routes corresponding to the clockwise service fiber $F_1$ and the counterclockwise protection fiber $F_4$, respectively, to select one therefrom The 2×2 optical switch 112 is provided between two opposite routes corresponding to the counterclockwise service fiber $F_2$ and the clockwise protection fiber $F_3$, respectively, to select one therefrom. The 2×2 optical switch 113 is provided between two routes corresponding to the counterclockwise service fiber $F_2$ and the counterclockwise protection fiber $F_4$, respectively, to select one therefrom. The respective locations of the 2×2 optical switches 110–113 are not limited to this embodiment as shown in FIG. 8. Another arrangement may be possible if the same function can be performed.

Operation

For simplicity, operations in the ring network will be described in the case where the node NODE1 communicates with the node NODE3.

Referring to FIG. 9A, under normal conditions, the node NODE1 communicates with the node NODE3 through the node NODE2, the clockwise service fiber $F_1$ and the counterclockwise service fiber $F_2$. The node NODE1 transmits an optical signal on wavelength $\lambda_3$ onto the clockwise service fiber $F_1$ and the node NODE3 receives the optical signal on wavelength $\lambda_3$ from the clockwise service fiber $F_1$. On the other hand, the node NODE3 transmits an optical signal on wavelength $\lambda_1$ onto the counterclockwise service fiber $F_2$ and the node NODE1 receives the optical signal on wavelength $\lambda_1$ from the counterclockwise service fiber $F_2$. Since the receiving wavelength of the node NODE2 is set to $\lambda_2$, none of the optical signals on wavelengths $\lambda_1$ and $\lambda_3$ is not received. The receiving/transmitting and add/drop operations of each node are as described before.

Referring to FIG. 9B, in the case of service fiber cut occurring between the node NODE2 and the node NODE3, the node NODE2 changes the respective connection states of the 2×2 optical switches 110 and 113 such that the clockwise service fiber $F_1$ is optically connected to the clockwise protection fiber $F_3$ and the counterclockwise protection fiber $F_4$ is optically connected to the counterclockwise service fiber $F_2$. Therefore, an optical signal on wavelength $\lambda_3$ is transferred from the clockwise service fiber $F_1$ to the clockwise protection fiber $F_3$ and an optical signal on wavelength $\lambda_1$ is transferred from the counterclockwise protection fiber $F_4$ to the counterclockwise service fiber $F_2$.

On the other hand, the node NODE3 changes the respective connection states of the 4×4 optical switches 105 and 106 such that an optical signal of wavelength $\lambda_1$ is transmitted onto the counterclockwise protection fiber $F_4$ and an optical signal on wavelength $\lambda_3$ is received from the clockwise protection fiber $F_3$.

Referring to FIG. 9C, in the case of service and protection fiber cut occurring between the node NODE2 and the node NODE3, the node NODE2 changes the respective connection states of the 2×2 optical switches 111 and 112 such that the clockwise service fiber $F_1$ is optically connected to the counterclockwise protection fiber $F_4$ and the clockwise protection fiber $F_3$ is optically connected to the counterclockwise service fiber $F_3$. Therefore, an optical signal on wavelength $\lambda_3$ is transferred from the clockwise service fiber $F_1$ to the counterclockwise protection fiber $F_4$ and an optical signal on wavelength $\lambda_1$ is transferred from the clockwise protection fiber $F_3$ to the counterclockwise service fiber $F_2$.

On the other hand, the node NODE3 changes the respective connection states of the 4×4 optical switches 105 and 106 such that the optical signal of wavelength $\lambda_1$ is transmitted onto the clockwise protection fiber $F_3$ and the optical signal on wavelength $\lambda_3$ is received from the counterclockwise protection fiber $F_4$.

Referring to FIG. 9D, in the case of failure of the node NODE2, the node NODE1 changes the respective connection states of the 4×4 optical switches 105 and 106 such that an optical signal on wavelength $\lambda_3$ is transmitted onto the counterclockwise protection fiber $F_4$ and an optical signal on wavelength $\lambda_1$ is received from the clockwise protection fiber $F_3$. Similarly, the node NODE3 changes the respective connection states of the 4×4 optical switches 105 and 106 such that an optical signal on wavelength $\lambda_1$ is transmitted onto the clockwise protection fiber $F_3$ and an optical signal on wavelength $\lambda_3$ is received from the counterclockwise protection fiber $F_4$.

As described above, the 4×4 optical switches 105 and 106 selectively connects the optical Add/Drop circuits 101–104 to the optical receivers and the optical transmitters of line terminals $T_1$–$T_4$, all wavelength components in the ring network are usable for services without the need of setting wavelengths for protection. Therefore, the wavelength components can be used effectively, resulting in reduced wavelength band and the reduced number of wavelengths to be selected in each node.

Further, since a routing function is implemented by the 2×2 optical switches 110–113, data transmission can be performed with a higher degree of efficiency.

As in the case of the first embodiment, by controlling the 4×4 optical switches 105 and 106 of each node, the communications mode as shown in FIG. 7 may be set under normal conditions.

Third Embodiment

Figure 10:
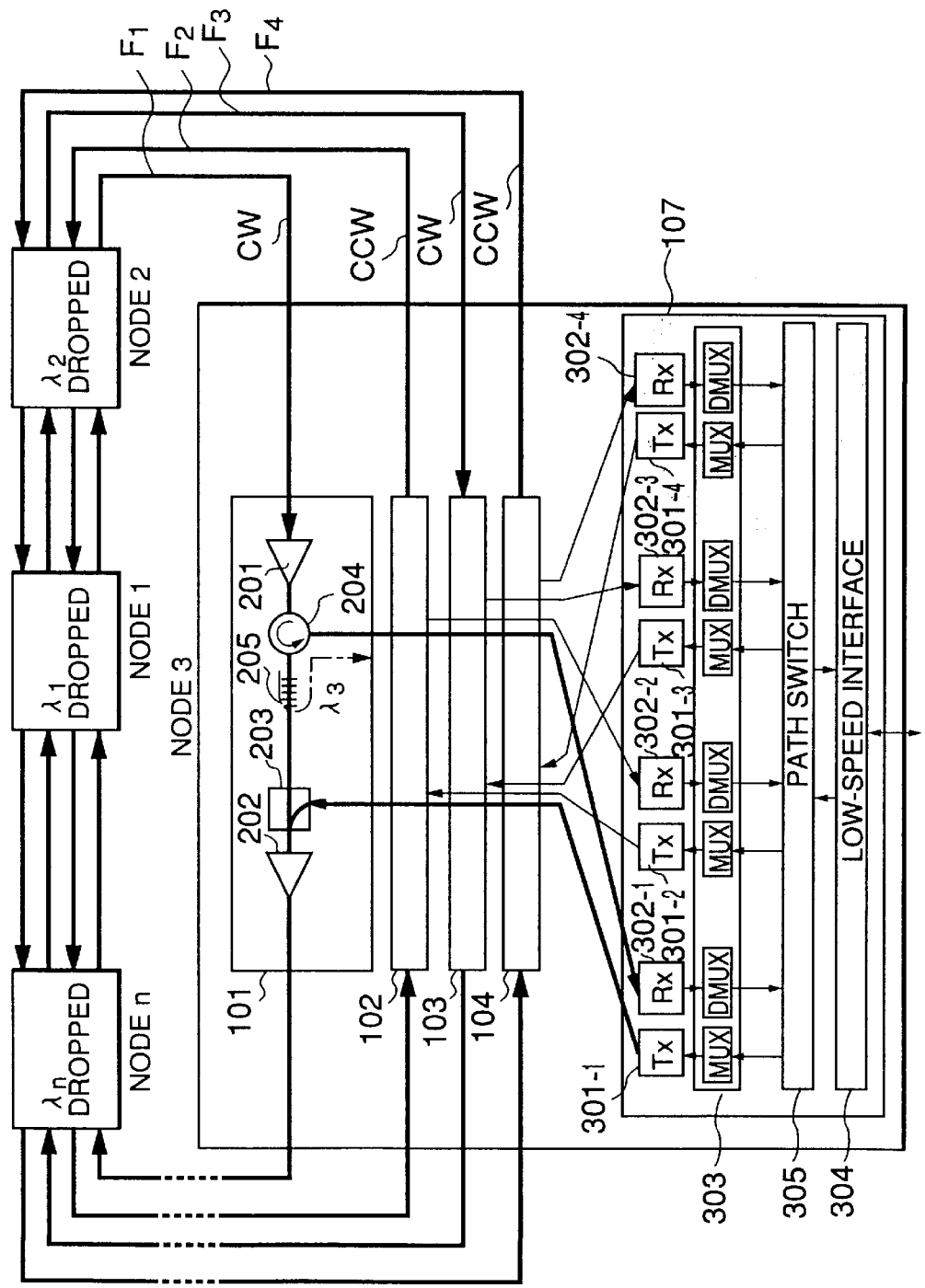
FIG. 10 is a block diagram showing an optical WDM ring network according to a third embodiment of the present invention.

Referring to FIG. 10, there is shown a WDM ring network where circuit blocks similar to those previously described with reference to FIG. 1 are denoted by the same reference numerals and their details will be described as necessary.

Each node has the same basic circuit configuration as shown in FIG. 10. Taking the node NODE3 as an example, it is provided with four optical Add/Drop circuits 101–104 which are inserted on the four fibers $F_1$–$F_4$, respectively. In each optical Add/Drop circuit, a signal on the assigned wavelength (here, $\lambda_3$) is dropped and output to an optical transceiver 107 and, on the other hand, a new signal to be added on a selected wavelength is received from the optical transceiver 107.

The optical transceiver 107 is provided with four tunable optical transmitters indicated by reference numerals 301-1 to 301-4, respectively, and four optical receivers indicated by reference numerals 302-1 to 302-4, respectively. As described before, each tunable optical transmitter can be set to a selected wavelength and each optical receiver is fixed to the assigned wavelength (here, $\lambda_3$). The respective pairs of transmitter and receiver are connected to multiplexer/demultiplexer circuits 303 which are in turn connected to a low-speed interface 304 through a path switch 305 which is formed with electrical circuits.

In the third embodiment, the path switch 305 is provided in place of the 4×4 matrix switches 105 and 106. The function of the path switch 305 is the same as that of the 4×4 matrix switches 105 and 106. In other words, four electrical signals to be processed in each node can be selectively connected to four arbitrary pairs of transmitter and receiver.

Therefore, the operations of the third embodiment are the same as those of the first embodiment as shown in FIGS. 6A–6D.

Since the path switch 305 which is formed with electrical circuits is employed, there is no need to mount two multiinput/output optical switches 105 and 106 on the node. Therefore, the circuit configuration of the optical system is simplified.

Fourth Embodiment

Referring to FIG. 11, there is shown a WDM ring network where circuit blocks similar to those previously described with reference to FIG. 1 are denoted by the same reference numerals and their details will be described as necessary.

The WDM ring network has a plurality of nodes NODE1, NODE2, ... NODEn which are optically connected in a ring topology through a clockwise fiber P1 and a counterclockwise fiber $F_2$. Each node has the same basic circuit configuration as shown in FIG. 11. Taking the node NODE3 as am example, it is provided with two optical Add/Drop circuits 101 and 102 which are inserted on the two fibers $F_1$ and $F_2$, respectively. In each optical Add/Drop circuit, a signal on the assigned wavelength (here, $\lambda_3$) is dropped and output to a 2×2 matrix switch 108 for reception and, on the other hand, a new signal to be added on a selected wavelength is received from a 2×2 matrix switch 109 for transmission.

The 2×2 matrix switch 108 selectively connects the optical Add/Drop circuits 101 and 102 to the optical-receivers of line terminals $T_1$ and $T_2$ depending on a selection control signal $S_{DR}$. Similarly, the 2×2 matrix switch 109 selectively connects the optical Add/Drop circuits 101 and 102 to the optical transmitters of the line terminals $T_1$ and $T_2$ depending on a selection control signal $S_{ADD}$.

Each of the line terminals $T_1$ and $T_2$ is provided with a tunable optical transmitter 301, an optical receiver 302, a multiplexer/demultiplexer 303 and a low-speed interface 304. The tunable optical transmitter 301 can be set to a selected wavelength and the optical receiver 302 is fixed to the corresponding wavelength (here, $\lambda_3$) as described before.

For simplicity, operations in the ring network will be described in the case where the node NODE1 communicates with the node NODE3.

Figure 12A:
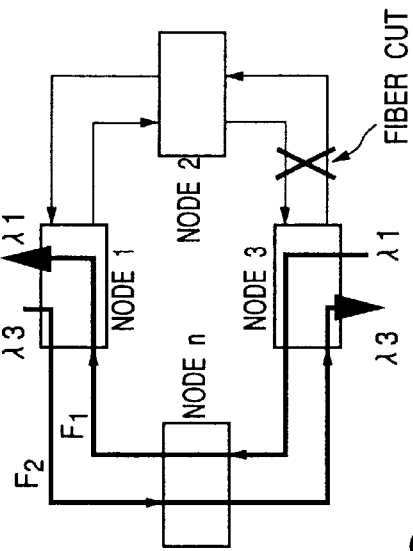
FIG. 12A is a diagram showing a normal operation of the fourth embodiment of FIG. 11.

Referring to FIG. 12A, under normal conditions, the node NODE1 communicates with the node NODE3 through the node NODE2, the clockwise fiber $F_1$ and the counterclockwise fiber $F_2$. The node NODE1 transmits an optical signal on wavelength $\lambda_3$ onto the clockwise fiber $F_1$ and the node NODE3 receives the optical signal on wavelength $\lambda_3$ from the clockwise fiber $F_1$. On the other hand, the node NODE3 transmits an optical signal on wavelength $\lambda_1$ onto the counterclockwise fiber $F_2$ and the node NODE1 receives the optical signal on wavelength $\lambda_1$ from the counterclockwise fiber $F_2$. The receiving/transmitting and add/drop operations of each node are as described before.

Figure 12B:
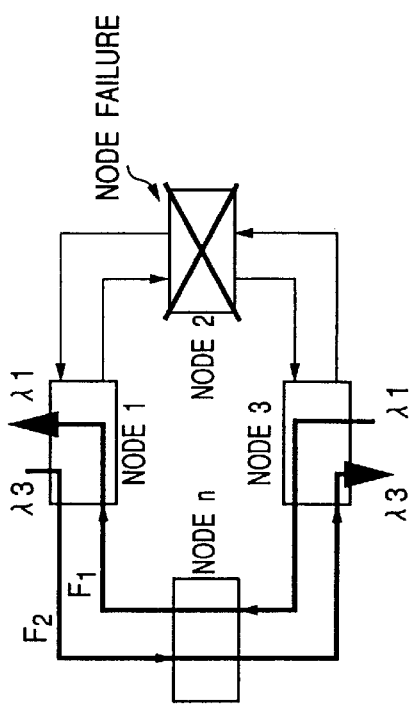
FIG. 12B is a diagram showing an operation of the fourth embodiment of FIG. 11 in the case of fiber cut.

Referring to FIG. 12B, in the case of fiber cut occurring between the node NODE2 and the node NODE3, the node NODE1 changes the respective connection states of the 2×2 optical switches 108 and 109 such that an optical signal on wavelength $\lambda_3$ is transmitted onto the counterclockwise fiber $F_2$ and an optical signal on wavelength $\lambda_1$ is received from the clockwise fiber $F_1$. Similarly, the node NODE3 changes the respective connection states of the 2×2 optical switches 108 and 109 such that an optical signal on wavelength $\lambda_1$ is transmitted onto the clockwise fiber $F_1$ and an optical signal on wavelength $\lambda_3$ is received from the counterclockwise fiber $F_2$.

Figure 12C:
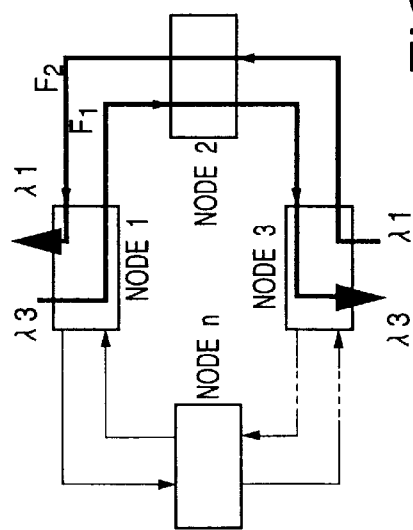
FIG. 12C is a diagram showing an operation of the fourth embodiment of FIG. 11 in the case of node failure.

Referring to FIG. 12C, in the case of failure of the node NODE2, the respective nodes NODE1 and NODE3 change the respective connection states of the 2×2 optical switches 108 and 109 as in the case of FIG. 12B.

As described above, even in the case of node failure and/or fiber cut, communications between two nodes can be ensured as normal.

Figure 13:
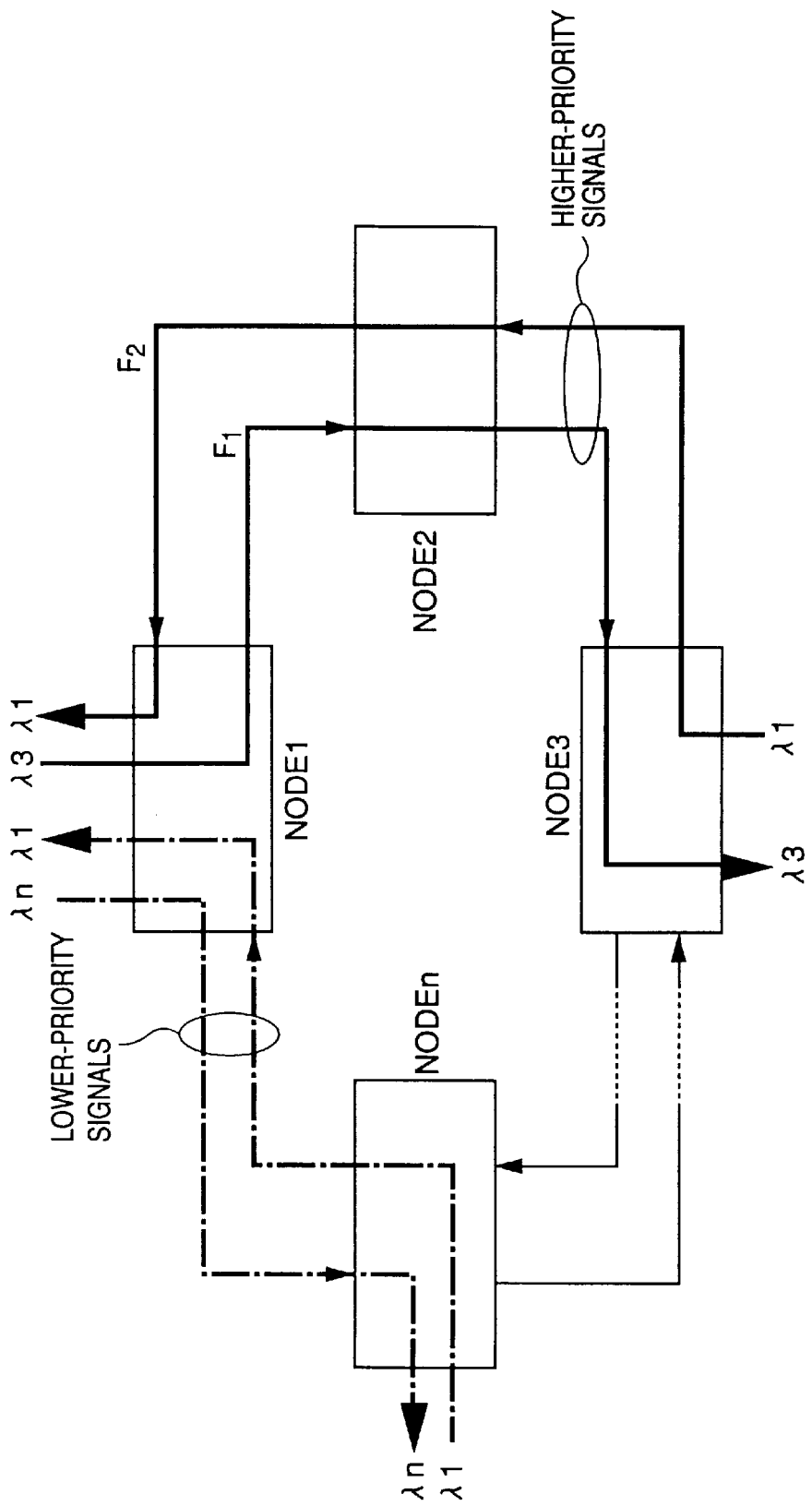
FIG. 13 is a diagram showing another normal operation of the fourth embodiment of FIG. 11.

As shown in FIG. 13, by controlling the 2×2 optical switches 108 and 109, another communications mode may be set under normal conditions. More specifically, the respective nodes NODE1 and NODE3 change the respective connection states of the 2×2 optical switches 108 and 109 such that a higher-priority signal on wavelength $\lambda_3$ is transferred from the node NODE1 to the node NODE3 through the node NODE2 traveling over the clockwise fiber $F_1$ and a higher-priority signal on wavelength $\lambda_1$ is transferred from the node NODE3 to the node NODE1 through the node NODE2 traveling over the counterclockwise fiber $F_2$. Further, the respective nodes NODE1 and NODEn change the respective connection states of the 2×2 optical switches 108 and 109 such that a lower-priority signal on wavelength $\lambda_n$ is transferred from the node NODE1 to the node NODEn traveling over the counterclockwise fiber $F_2$ and a lower-priority signal on wavelength $\lambda_1$ is transferred from the node NODE3n to the node NODE1 traveling over the clockwise fiber $F_1$. In this communication mode, when fiber cuts or node failures occur, the higher-priority communications are protected as described above but the lower-priority communications are possibly broken down. In other words, the lower-priority communications may be performed based on the premise of the possibility of breakdown.

Fifth Embodiment

Figure 14:
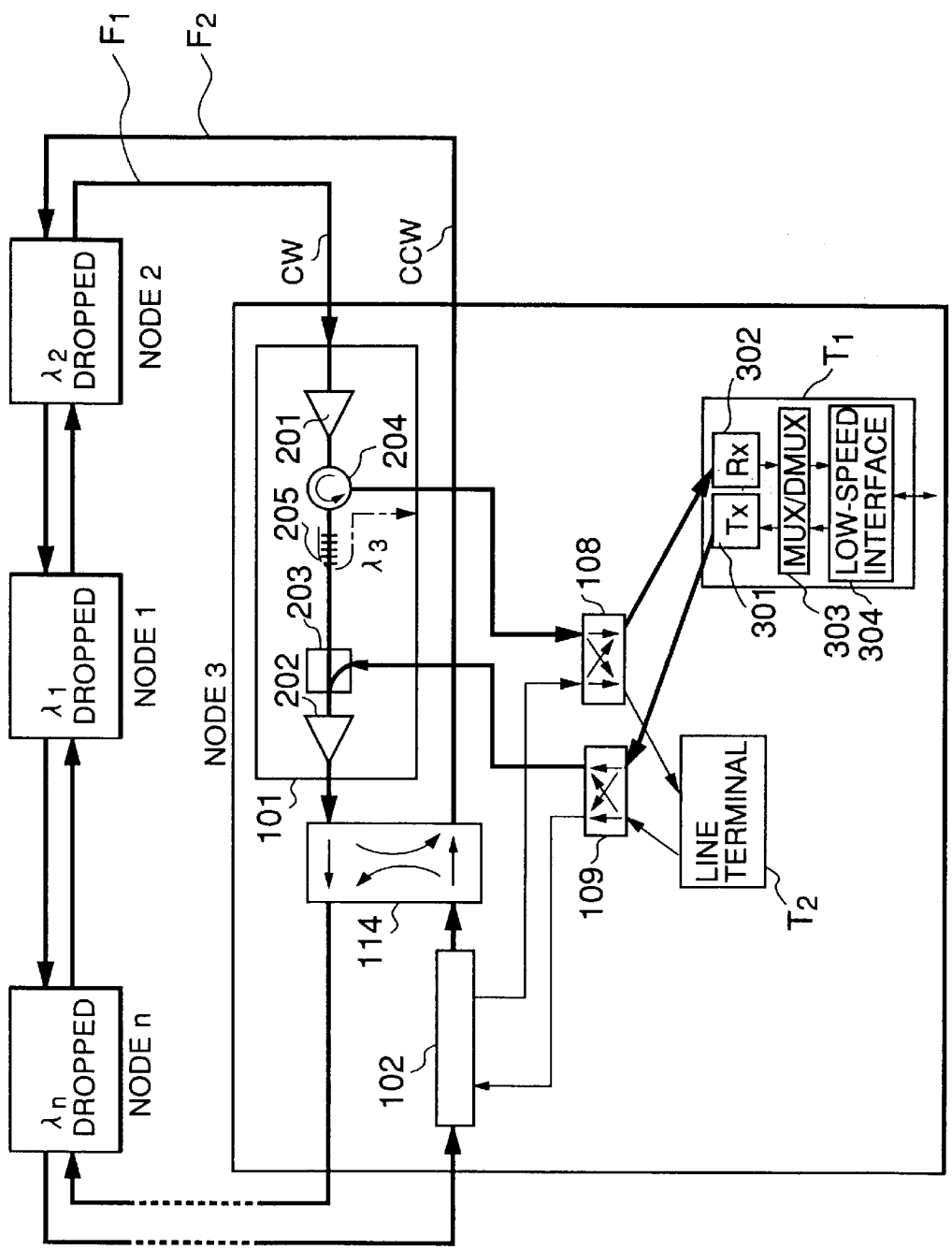
FIG. 14 is a block diagram showing an optical WDM ring network according to a fifth embodiment of the present invention.

Referring to FIG. 14, there is shown a WDM ring network where circuit blocks similar to those previously described with reference to FIG. 11 are denoted by the same reference numerals and their details will be described as necessary.

Each node has the same basic circuit configuration as shown in FIG. 11. Taking the node NODE3 as an example, it is provided with two optical Add/Drop circuits 101 and 102 which are inserted on the two fibers $F_1$ and $F_2$, respectively. In each optical Add/Drop circuit, a signal on the assigned wavelength (here, $\lambda_3$) is dropped and output to a 2×2 matrix switch 108 for reception and, on the other hand, a new signal to be added on a selected wavelength is received from a 2×2 matrix switch 109 for transmission.

The 2×2 matrix switch 108 selectively connects the optical Add/Drop circuits 101 and 102 to the optical receivers of line terminals $T_1$ and $T_2$ depending on a selection control signal $S_{DR}$. Similarly, the 2×2 matrix switch 109 selectively connects the optical Add/Drop circuits 101 and 102 to the optical transmitters of the line terminals $T_1$ and $T_2$ depending on a selection control signal $S_{ADD}$.

Each of the line terminals $T_1$ and $T_2$ is provided with a tunable optical transmitter 301, an optical receiver 302, a multiplexer/demultiplexer 303 and a low-speed interface 304. The tunable optical transmitter 301 can be set to a selected wavelength and the optical receiver 302 is fixed to the corresponding wavelength (here, $\lambda_3$) as described before.

Further, each node has a routing function which is implemented by 2×2 optical switch 114 as shown in FIG. 14. More specifically, the 2×2 optical switch 114 is provided between two opposite routes corresponding to the clockwise fiber $F_1$ and the counterclockwise fiber $F_2$, respectively, to select one from the two opposite routes. The location of the 2×2 optical switch 114 is not limited to this embodiment as shown in FIG. 14. Another arrangement may be possible if the same function can be performed.

Operation

For simplicity, operations in the ring network will be described in the case where the node NODE1 communicates with the node NODE3.

Figure 15B:
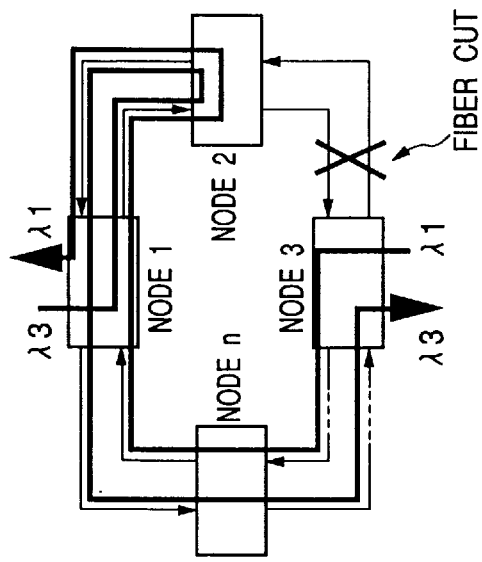
FIG. 15B is a diagram showing an operation of the fifth embodiment of FIG. 14 in the case of fiber cut.
Figure 15A:
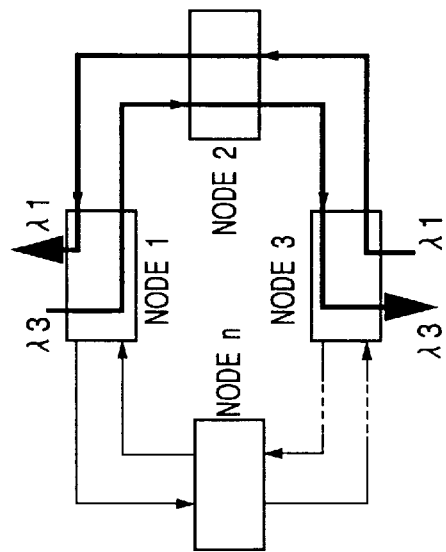
FIG. 15A is a diagram showing a normal operation of the fifth embodiment of FIG. 14.

Referring to FIG. 15A, under normal conditions, the node NODE1 communicates with the node NODE3 through the node NODE2, the clockwise fiber $F_1$ and the counterclockwise fiber $F_2$. The node NODE1 transmits an optical signal on wavelength $\lambda_2$ onto the clockwise fiber $F_1$ and the node NODE3 receives the optical signal on wavelength $\lambda_3$ from the clockwise fiber $F_1$. On the other hand, the node NODE3 transmits an optical signal on wavelength $\lambda_1$ onto the counterclockwise fiber $F_2$ and the node NODE1 receives the optical signal on wavelength $\lambda_1$ from the counterclockwise fiber $F_2$. Since the receiving wavelength of the node NODE2 is set to $\lambda_2$, none of the optical signals on wavelengths $\lambda_1$ and $\lambda_3$ is not received. The receiving/transmitting and add/drop operations of each node are as described before.

Referring to FIG. 15B, in the case of fiber cut occurring between the node NODE2 and the node NODE3, the node NODE2 changes the respective connection states of the 2×2 optical switch 114 such that the clockwise fiber $F_1$ is optically connected to the counterclockwise fiber $F_2$. Therefore, optical signals on wavelength $\lambda_3$ and $\lambda_1$ are transferred from the clockwise fiber $F_1$ to the counterclockwise fiber $F_2$.

On the other hand, the node NODE3 changes the respective connection states of the 2×2 optical switches 108 and 109 such that the optical signal of wavelength $\lambda_1$ is transmitted onto the clockwise fiber $F_1$ and the optical signal on wavelength $\lambda_2$ is received from the counterclockwise fiber $F_2$.

Figure 15C:
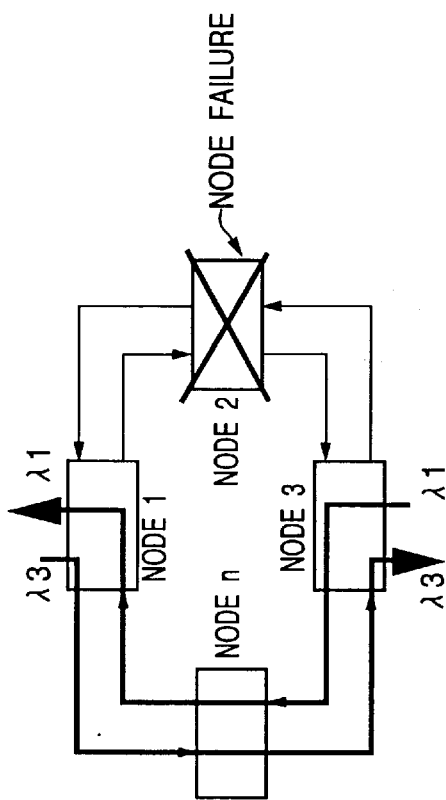
FIG. 15C is a diagram showing an operation of the fifth embodiment of FIG. 14 in the case of node failure.

Referring to FIG. 15C, in the case of failure of the node NODE2, the node NODE1 changes the respective connection states of the 2×2 optical switches 108 and 109 such that an optical signal on wavelength $\lambda_3$ is transmitted onto the counterclockwise fiber $F_2$ and an optical signal on wavelength Al is received from the clockwise fiber $F_1$. Similarly, the node NODE3 changes the respective connection states of the 2×2 optical switches 108 and 109 such that an optical signal on wavelength $\lambda_1$ is transmitted onto the clockwise fiber $F_1$ and an optical signal on wavelength $\lambda_3$ is received from the counterclockwise fiber $F_2$.

As in the case of the fourth embodiment, by controlling the 2×2 optical switches 108 and 109 of each node, the communications mode as shown in FIG. 13 may be set under normal conditions.

Control System

Taking the first embodiment as shown in FIG. 1 as an example, a control system for each node will be described hereinafter.

Figure 16:
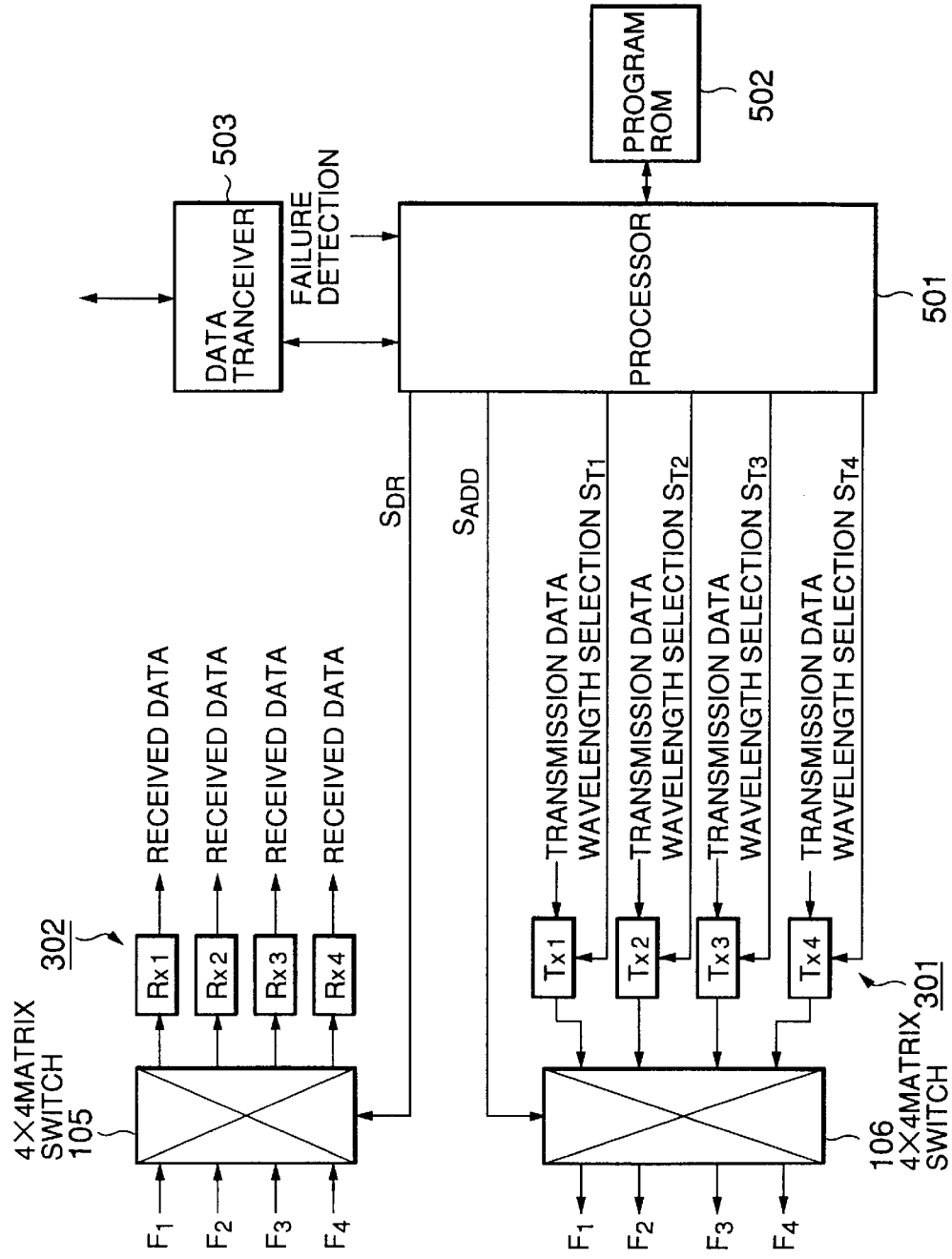
FIG. 16 is a block diagram showing the control circuit of a node according to the first embodiment of the present invention.

Referring to FIG. 16, in addition to circuit elements as shown in FIG. 1, each node is further provided with a control processor 501, a program memory 502 and a data transceiver 503 for communicating with a network manager (not shown). The control processor 501 controls the operations of the node as shown in FIGS. 6A–6D according to a control program stored in the program memory 502. More specifically, when a failure is detected in a node, the control processor 501 thereof transmits the failure indication signal to the network manager. The network manager decided the optimal restoration plan based on failure indication signals polled from nodes, and then sends the restoration plan data to the nodes where the signal rerouting is needed. In the nodes where the restoration plan data is received through the data transceiver 503, the control processor 501, depending on the restoration plan, outputs the selection control signals $S_{DR}$ and $S_{ADD}$ to the 4×4 matrix switches 105 and 106, respectively, and further outputs wavelength selection signals $S_{T1}$–$S_{T4}$ to the optical transmitters $Tx_1$–$Tx_4$ which are provided in the line terminals $T_1$–$T_4$, respectively. Any restoration plan may be obtained not only by the network manager but also by the control processor using inter-node data communications.

In a control system of the second embodiment as shown in FIG. 8, in addition to the selection control signals $S_{DR}$ and $S_{ADD}$ and the wavelength selection signals $S_{T1}$–$S_{T4}$, the control processor 501 outputs switch control signals to the 2×2 optical switches 110–113, respectively. In the second embodiment, any failure such as fiber cut and node failure may be usually detected by inter-node communications. Similarly, control systems for the third to fifth embodiments can be formed.

The present invention is not limited to the first to third embodiments having two bidirectional transmission lines each consisting of two fibers. Three or more bidirectional transmission lines may be used depending on the amount of transmission data. The number of Add/drop circuits and line terminals needs to be equal to the total number of fibers included in the transmission lines and further the number of input/output terminals of optical switch is also equal to the total number of fibers. Furthermore, the fourth and fifth embodiments can be applied to one of three or more bidirectional transmission lines.

What is claimed is:

1. A ring network comprising:

a plurality of pairs of transmission lines, said transmission lines in each pair carrying signals in opposite directions; and first, second, and third nodes coupled through the plurality of pairs of transmission lines in a ring topology, each of the nodes comprising:

(a) at least one transceiver for transmitting and receiving a plurality of signals; and (b) a first route changing switch which changes paths for signals transmitted and received to and from one pair of said transmission lines, said path change by said first route changing switch causing said signals to be transmitted and received by said each node along another pair of said transmission lines and (c) a second route changing switch connected between at least two of said transmission lines, said second route changing switch changing a route by switching between said at least two of said transmission lines.

wherein when a failure occurs between said first node and said third node, the second route changing switch in said second node switches a route between said second node and third node from a first pair of said transmission lines to a second pair of said transmission lines, said second pair of transmission lines carrying signals in a same direction around said ring topology as said first pair of transmission lines.

2. The ring network of claim 1, wherein said plurality of nodes includes a first node, a second node, and a third node, and wherein when at least one of said transmission lines connecting said second node and said third node fails, said second route changing switch in said second node switches to change a route of communication between said first node and said third node.

3. The ring network of claim 2, wherein the route change performed by said second route changing switch reverses a direction signals are communicated between said first node and said third node within said ring topology.

4. The ring network of claim 3, wherein said first route changing switch in said third node switches to connect the transceiver to said another one of said transmission lines so that said third node communicates with said first node along said changed route, and wherein said first route changing switch in said first node does not switch so that the transceiver of said first node is connected by said first route changing means to a same one of said transmission lines as said first node was connected before said failure.

5. The ring network according to claim 1, wherein the transceiver is coupled with the transmission media and said first route changing switch selectively connects the signals to the transmission media.

6. A ring network comprising:

a plurality of transmission media; and a plurality of nodes coupled through the transmission media in a ring topology, each of the nodes comprising:

(a) a transceiver for transmitting and receiving a plurality of signals; and (b) a first route changing switch which changes a path for each signal which is transmitted and received to and from one of the transmission media through the path, said path change by said first route changing switch causing signals to be transmitted and received by said each node along another one of said transmission media, and (c) a second route changing switch connected between at least two of said transmission media, said second route changing switch changing a route by switching between said at least two of said transmission media, wherein said first route changing switch is provided between the transceiver and the transmission media to selectively connect the signals to the transmission media.

7. A ring network comprising:

an even-number of optical fibers wherein each pair of optical fibers forms a bidirectional transmission line; and a plurality of nodes coupled through the optical fibers in a ring topology, each of the nodes comprising:

(a) the even-number of interfaces coupled to the optical fibers, respectively;

(b) the even-number of optical transceivers each comprising an optical transmitter and an optical receiver, wherein each of the optical transmitter and the optical receiver is coupled to a selected one of the interfaces;

(c) a first route changing switch for changing a combination of an interface and each of the optical transmitter and the optical receiver; and (d) the even-number of second route changing switches connected to pairs of said optical fibers, at least a portion of said second route changing switches changing a route by switching between said pairs of transmission lines connected to said portion of second route changing switches.

8. The ring network according to claim 7, wherein the switch is an optical switch for coupling each of the interfaces to each of the optical transmitter and the optical receiver.

9. The ring network according to claim 8, wherein the optical switch comprises a first optical switch and a second optical switch, wherein the first optical switch couples each of the interfaces to the optical transmitter of each optical transceiver and the second optical switch couples each of the interfaces to the optical receiver of each optical transceiver.

10. The ring network according to claim 7, wherein the interfaces are coupled to the optical transmitters, respectively, and the interfaces are coupled to the optical receivers, respectively, wherein the switch is an electrical switch for selecting an optical transmitter and an optical receiver from the optical transceivers.

11. The ring network according to claim 7, wherein each of the nodes has a different receiving wavelength assigned thereto.

12. The ring network according to claim 11, wherein the optical transmitter produces an optical transmission signal having a wavelength selected from a set of wavelengths which are previously assigned to the nodes, respectively.

13. The ring network according to claim 12, wherein the optical receiver is set to a predetermined receiving wavelength assigned thereto.

14. The ring network of claim 7, wherein said plurality of nodes includes a first node, a second node, and a third node, and wherein when at least one of said pair of optical fibers connecting said second node and said third node fails, said second route changing switch in said second node switches to change a route of communication between said first node and said third node.

15. The ring network of claim 7, wherein said route changing switches use wavelength multiplexing to perform routing on a wavelength basis, such that an optical signal output from any of said plurality of nodes is set to a wavelength determined by a destination node.

16. The ring network of claim 7, wherein half of said second switches are connected to transmission lines which carry signals in a same direction around said ring topology, and wherein the other half of said second switches are connected to transmission lines which carry signals in opposite directions around said ring topology.

17. The ring network of claim 16, wherein said plurality of nodes includes a first node, a second node, and a third node, and wherein when a failure occurs between said first node and said third node, said first node communicates with said third node in a same direction as communications were performed between said first node and said third node before failure, by transmitting signals along an alternative pair of optical fibers.

18. A network interface unit in a ring network comprising;

an even-number of optical fibers wherein each pair of optical fibers forms a bidirectional transmission line;

a plurality of nodes coupled through the optical fibers in a ring topology each of said nodes including:

the even-number of interfaces coupled to the optical fibers, respectively;

the even-number of optical transceivers each comprising an optical transmitter and an optical receiver, wherein each of the optical transmitter and the optical receiver is coupled to a selected one of the interfaces;

a first route changing switch for changing a combination of an interface and each of the optical transmitter and the optical receiver; and second route changing switches connected to pairs of said optical fibers, at least a portion of said second route changing switches changing a route by switching between said pairs of transmission lines connected to said portion of second route changing switches.

19. The network interface unit according to claim 18, wherein the switch is an optical switch for coupling each of the interfaces to each of the optical transmitter and the optical receiver.

20. The network interface unit according to claim 19, wherein the optical switch comprises a first optical switch and a second optical switch, wherein the first optical switch couples each of the interfaces to the optical transmitter of each optical transceiver and the second optical switch couples each of the interfaces to the optical receiver of each optical transceiver.

21. The network interface unit according to claim 18, wherein the interfaces are coupled to the optical transmitters, respectively, and the interfaces are coupled to the optical receivers, respectively, wherein the switch is an electrical switch for selecting an optical transmitter and an optical receiver from the optical transceivers.

* * * * *